(12) United States Patent
Leitman

(10) Patent No.: US 11,825,282 B1
(45) Date of Patent: Nov. 21, 2023

(54) PORTABLE WIRELESS SOUND SYSTEM

(71) Applicant: Jeff Leitman, Irvine, CA (US)

(72) Inventor: Jeff Leitman, Irvine, CA (US)

( * ) Notice: Subject to any disclaimer, the term of this patent is extended or adjusted under 35 U.S.C. 154(b) by 0 days.

(21) Appl. No.: 17/396,612

(22) Filed: Aug. 6, 2021

Related U.S. Application Data

(60) Provisional application No. 63/062,386, filed on Aug. 6, 2020.

(51) Int. Cl.
*H04R 3/12* (2006.01)
*H04R 5/02* (2006.01)
*H04B 1/16* (2006.01)
*H04L 12/28* (2006.01)

(52) U.S. Cl.
CPC ............ *H04R 3/12* (2013.01); *H04B 1/1653* (2013.01); *H04R 5/02* (2013.01); *H04L 12/28* (2013.01); *H04R 2420/07* (2013.01)

(58) Field of Classification Search
CPC ......... H04R 3/12; H04R 5/02; H04R 2420/07
USPC ......................................... 381/58–59, 77–82
See application file for complete search history.

(56) References Cited

U.S. PATENT DOCUMENTS

| | | | | |
|---|---|---|---|---|
| 6,807,284 | B2* | 10/2004 | Nakamura | H04R 1/2811 |
| | | | | 381/345 |
| 9,326,069 | B2* | 4/2016 | Mayman | G06F 13/42 |
| 9,544,689 | B2* | 1/2017 | Fisher | H04W 4/80 |
| 10,021,768 | B2* | 7/2018 | Arai | F21V 23/023 |
| 10,136,201 | B2* | 11/2018 | Fisher | H04R 1/02 |
| 10,522,124 | B2* | 12/2019 | Lawande | G10H 1/0083 |
| 11,494,159 | B2* | 11/2022 | Tsui | G06F 3/165 |
| 2017/0127184 | A1* | 5/2017 | Mertel | H04R 27/00 |

* cited by examiner

*Primary Examiner* — Disler Paul
(74) *Attorney, Agent, or Firm* — Bryan Fibel

(57) ABSTRACT

A portable wireless sound system comprising at least two speakers is provided. A first speaker is determined to be a host speaker by having a wireless connection to a source device, such that the host speaker receives audio data from the connected source device, outputs the audio data signal, and plays audio. One or speakers are determine to be a satellite speaker by not having a connection to a source device, such that the satellite speakers receive audio data from the host speaker and play audio.

4 Claims, 2 Drawing Sheets

PORTABLE WIRELESS SOUND SYSTEM

CROSS REFERENCE TO RELATED APPLICATIONS

This application claims priority from provisional U.S. patent application No. 63/062,386 filed on Aug. 6, 2020.

FIELD OF THE INVENTION

Embodiments of the invention generally relate to portable wireless speakers and subwoofers. Embodiments of the invention specifically relate to wireless speakers and subwoofers capable of receiving from and broadcasting to other speakers and subwoofers.

BACKGROUND OF THE INVENTION

Bluetooth is a wireless technology standard used for exchanging data between fixed and mobile devices over short distances. As mobile devices grow in popularity, this communication between devices is more commonly used. Speakers can utilize Bluetooth to receive and emit sound data from a source device. Speakers increase the audio output and sound fidelity significantly compared to the source device. However, the sound clarity and volume of speakers still are limited over larger areas and distances, encouraging a multiple speaker setup to cover large areas or to create stereophonic and immersive soundscapes.

SUMMARY

A portable wireless sound system comprising at least two speakers is provided. A first speaker is determined to be a host speaker by having a wireless connection to a source device, such that the host speaker receives audio data from the connected source device, outputs the audio data signal, and plays audio. One or speakers are determine to be a satellite speaker by not having a connection to a source device, such that the satellite speakers receive audio data from the host speaker and play audio.

Additionally, the one or more satellite speakers can connect to and recognize the host speaker. The host speaker can broadcasts the audio data to all satellite speakers in range. Shutting off the host speaker can shut off all satellite speakers. The speakers can have a channel selector such that the speaker can play audio in left, right, or stereo channels. One or more speakers can be a subwoofer. The host speaker can control the audio output of the satellite speakers

DETAILED DESCRIPTION

Reference will now be made in detail to the present embodiments discussed herein, illustrated in the accompanying drawings. The embodiments are described below to explain the disclosed invention by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate. Those skilled in the art will recognize that other implementations may be performed that may include different structures or components that perform similar tasks.

A portable wireless sound system comprising at least two speakers is provided. It is understood that the use of speaker, for the purpose of this disclosure, includes subwoofer and the description of speakers and speaker features apply to subwoofers, and no limitation is intended. Where applicable, subwoofer will be used when specifically referring to subwoofers and subwoofer features.

Figure 1:
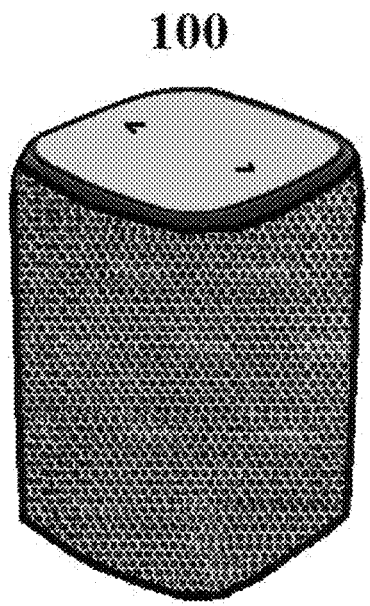
FIG. 1 is a speaker embodiment.

As depicted in FIG. 1, a speaker 100 capable of receiving from and broadcasting to other speakers is provided. The disclosed speaker is capable of acting as a broadcasting speaker (host) or a receiving speaker (satellite). This stadium functionality allows multiple speakers to connect to each other. No outside software, application or other components are needed in addition to the speaker to control or connect the speakers. In addition to traditional audio speaker components that play audio contained within the speaker housing, such a speaker can have installed on it software, firmware, hardware, or a combination of them that in operation causes the speaker to perform operations or actions. Other components can include a processor and a communication transceiver (or a receiver and transmitter).

Figure 2:
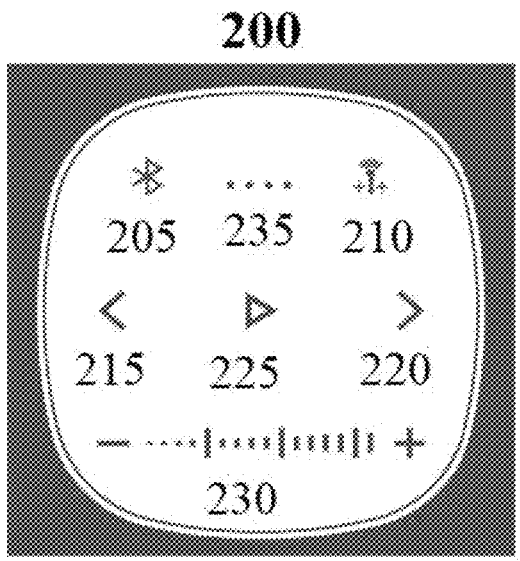
FIG. 2 is a speaker user interface.

As depicted in FIG. 2 an intuitive user interface 200 allows for controlling much of the speaker functionality. The speaker is turned on and connects to the source device through Bluetooth wireless standard, known to those in the art. In the depicted embodiment, the Bluetooth button/light 205 on the user interface activates the Bluetooth capability to pair with a source device, where the source device can be a phone, tablet or laptop or any other audio player capable of Bluetooth communication. Entering pairing mode and a successful pairing is indicated by the button/light. 205. This allows the speaker to play audio that originates from the source device. The speaker is also capable of connecting and receiving input from a source device through an auxiliary or similar cable connection.

The host broadcasting function is activated by a stadium selector button/light 210 on the user interface, whereby upon activation the speaker becomes a host broadcasting speaker. In order to be a host broadcasting speaker, the speaker must be one that is connected to a source device. The speaker does not need to be configured by an outside application or preconfigured as a host, rather the speaker recognizes that it is connected to a source device and begins broadcasting upon pressing the stadium selector button/light. The host broadcasting speaker produces an output that includes audio and an identifying signal that can be received by other compatible speakers within range of the broadcast. In the depicted implementation, the host speaker does not recognize or connect to other speakers in the depicted embodiment and only produces an output. In other speaker system embodiments, the host speaker recognizes and connects to each satellite speaker.

A speaker not connected to a source device establishes itself as a satellite speaker and is activated by a stadium selector button/light 210 on the user interface, whereby upon activation the speaker becomes a host broadcasting speaker. In order to be a satellite speaker, the speaker is one that is not connected to a source device. The speaker does not need to be configured by an outside application or preconfigured as a satellite, rather the speaker recognizes that it is not connected to a source device and begins receiving data. A Bluetooth pairing is indicated by the button/light 205, and if the light indicates a pairing, the button can be used to disengage from a source device. Because the speaker is not connected to a source device, as indicated by the Bluetooth button/light, the stadium button causes the speaker to be a satellite receiving speaker and seek transmission from a host speaker. The satellite speaker connects to and receives the output from a host broadcasting speaker, including the audio and identifying signal, allowing the satellite speaker to play audio that originates from the source device, as indicated by the stadium button/light.

This forms a speaker system whereby a source device provides output to a host speaker which provides output to one or more satellite speakers, the speakers comprising the speaker system. The host speaker via the user interface controls the track selection 215 220, play and pause 225 of the audio in the system. The volume 230 on the host and satellite speaker can be controlled independently via the user interface. The volume button additionally, when tapped, indicates the battery level on the battery level display 235.

Figure 3:
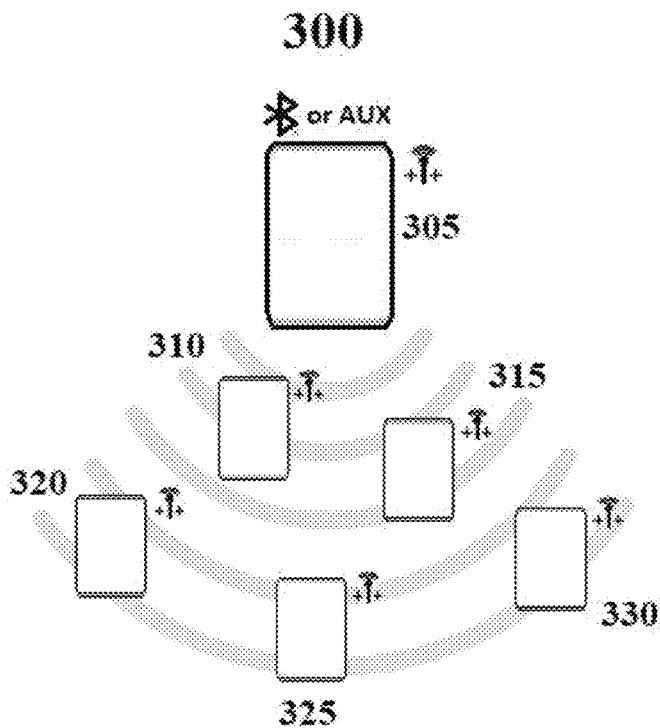
FIG. 3 is a diagram showing how a host speaker wirelessly transmits to satellite speakers.
Figure 4:
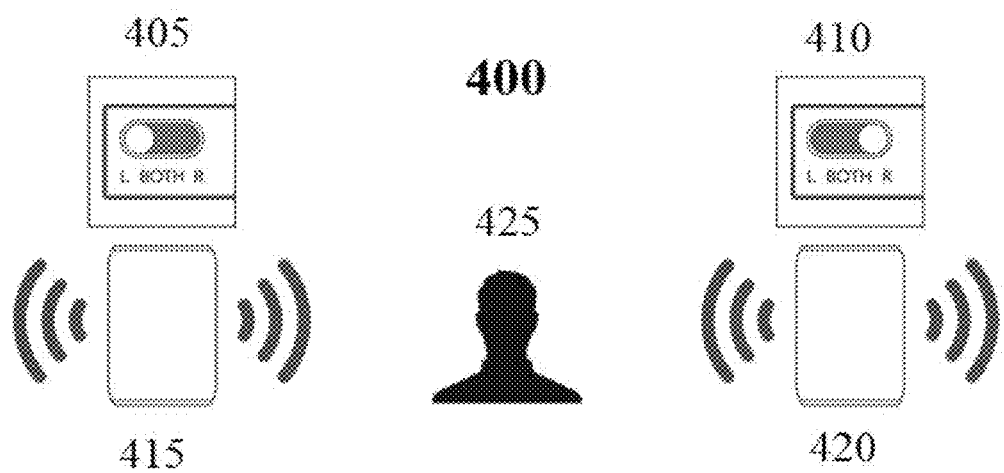
FIG. 4 is a diagram showing how each speaker can be adjusted to a specific audio channel.

As depicted in FIG. 3, a system embodiment 300 having multiple satellite receiving speakers able to receive the output from a single host broadcasting speaker is provided, wherein such a speaker system may comprise one host and one or more satellites. The host speaker 305 broadcasts an output having a range. Satellite speakers 310 315 320 325 330 that are on, have stadium functionality activated, and are in range will connect to and receive the output from the host broadcasting speaker. Thus, an unlimited number of speakers within range can join and receive output from a single broadcasting host speaker. The identifying signal, in the output that the satellite speaker receives, identifies which host speaker the output is coming from. Satellite speakers will remember, via the identifying signal, that they are connected to a host broadcasting speaker over a series of sessions (having been turned on and off). The identifying signal also allows multiple speaker systems to exist simultaneously, whereby one speaker system comprises one host and one or more satellites and another speaker system may comprise one host and one or more satellites. The satellites receive the correct audio from the correct host because of the identifying signal. Note that while the satellite speaker recognizes and identifies the host speaker that it is receiving output from, the host speaker does not recognize satellite speakers. In order for a satellite speaker to become a host, the stadium functionality must be deactivated, Bluetooth activated and successfully paired with a source device, and then the stadium functionality can be reactivated.

In the disclosed embodiment, turning off the host broadcasting speaker shuts off all satellite speakers connected to the host. This can be accomplished by an "off" signal transmitted by We host to any connected satellites. The satellites receive the "off" command causing them to shut off. In other implementations, a satellite is configured to turn off when turning off the host severs the connection and satellite ceases to receive the identifying signal. Speakers can also be configured to turn off after a period of inactivity. Such inactivity would include a host speaker no longer receiving audio from a connected source device and a satellite speaker no longer receiving audio from a host speaker.

Stereo is the use of two distinct audio channels in a way that creates the experience of sound heard from various directions, as with natural hearing. If a source device that sends both left and right channels of audio to a host speaker, the host speaker will be able to play both channels. The speaker can, via a toggle selector, choose to play only the left channel 405 or right channel 410 or both audio channels. Further the host speaker, regardless of which channel it is playing will output both Channels to any connected satellite speakers allowing the host and satellite speaker to play left, right or stereo channels independently. Thus, a host speaker and a satellite speaker can be positioned on the left side 415 and right side 420 of a user 425, whereby each speaker plays only the desired channel. Once again, because of the unlimited number of satellites that can be added to the speaker system and We ability to toggle the audio channels, there are numerous placement configurations.

Figure 5:
FIG. 5 is a subwoofer embodiment.

As depicted in FIG. 5, a subwoofer 500 having the same capability as speakers, of receiving from and broadcasting to other speakers, is provided. The subwoofer processes and plays sound within the low end of the sound spectrum, which is generally 20 Hz to 200 Hz, though other ranges may be contemplated. By limiting the sound spectrum being decoded to only the low frequencies, the subwoofer is able to act as a bass powered driver, Traditionally a subwoofer requires a significant amount power to cause its bass speaker driver (cone) to vibrate to create sounds waves as it moves in and out. By attaching the bass speaker driver to an airtight speaker frame, the air within the frame is compressed and expanded as the bass speaker driver moves in and out. The air compression and expansion amplifies the power of the driver, making it more reactive and efficient. Additionally, some of the energy created by the compression and expansion of the air within the sub-woofer case is also used to move weighted membranes that create their own sound waves to complement the sound waves being generated by the powered driver. These techniques and structures enable the disclosed subwoofer to overcome traditional subwoofer power requirements that are greater than the amount of power that can be supplied without a corded power source. The addition of a portable subwoofer allows for the creation of portable 2.1 sound system comprised of a left channel speaker, a right a channel speaker and a subwoofer.

The preceding description contains embodiments of the invention and disclosed features and no limitation of the scope is thereby intended.

The invention claimed is:

1. A wireless portable speaker system comprising: a speaker, the speaker determined to be a host speaker by having a wireless connection to a source device, such that the host speaker receives audio data from the connected source device; one or more speakers, the one or more speakers determined to be one or more satellite speakers by not having a connection to a source device; wherein the host speaker plays audio and outputs the audio data to any satellite speaker within range, and without the host speaker pairing with any of the one or more satellite speakers, such that the one or satellite speakers by being in range of the output, receive the audio data from the host speaker and play audio and wherein shutting off the host speaker shuts off all satellite speakers.

2. The wireless portable speaker system of claim 1, wherein the one or more satellite speakers recognize the host speaker to allow multiple systems in range to exist simultaneously.

3. The wireless portable speaker system of claim 1, wherein each speaker, via its channel selector, plays audio in left, right, or stereo channels.

4. The wireless portable speaker system of claim 1, wherein one or more speakers is a subwoofer.

* * * * *